United States Patent
Aljamaan et al.

(10) Patent No.: US 11,746,961 B2
(45) Date of Patent: Sep. 5, 2023

(54) SIMULTANEOUS INJECTION-REPRODUCTION IN UNDERGROUND GAS STORAGE

(71) Applicant: SAUDI ARABIAN OIL COMPANY, Dhahran (SA)

(72) Inventors: Hamza M. Aljamaan, Dammam (SA); Ammar H. Alali, Al Hasa (SA); Nedhal M. Al-Musharfi, Dhahran (SA); Adnan A. Al-Kanaan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 167 days.

(21) Appl. No.: 17/325,560

(22) Filed: May 20, 2021

(65) Prior Publication Data

US 2022/0372855 A1    Nov. 24, 2022

(51) Int. Cl.
*B65G 5/00*    (2006.01)
*F17D 5/00*    (2006.01)
*F17D 1/04*    (2006.01)

(52) U.S. Cl.
CPC .............. *F17D 5/005* (2013.01); *B65G 5/00* (2013.01); *F17D 1/04* (2013.01)

(58) Field of Classification Search
CPC ... F17D 5/005; F17D 1/04; F17D 3/01; B65G 5/00; E21B 43/168; E21B 2200/20; E21B 2200/22
See application file for complete search history.

(56) References Cited

U.S. PATENT DOCUMENTS

| | | | |
|---|---|---|---|
| 2007/0251146 A1 | 11/2007 | Larter et al. | |
| 2009/0136414 A1* | 5/2009 | Petrinec | C01B 17/033 |
| | | | 423/578.1 |
| 2013/0098608 A1* | 4/2013 | Barnum | E21B 43/006 |
| | | | 166/263 |
| 2015/0125210 A1 | 5/2015 | Ingersoll et al. | |

(Continued)

FOREIGN PATENT DOCUMENTS

| | | |
|---|---|---|
| CA | 2788606 A1 | 2/2013 |
| CN | 103850711 A | 6/2014 |

(Continued)

OTHER PUBLICATIONS

D. L. Katz et al. "Predicting Yield of Revaporized Condensate in Gas Storage" JPT Forum 35 1173-1175; Jun. 1983 (3 pages).

(Continued)

*Primary Examiner* — Carib A Oquendo
(74) *Attorney, Agent, or Firm* — Osha Bergman Watanabe & Burton LLP (57) ABSTRACT

A method for an underground gas storage reservoir management may include obtaining feed from a domestic master gas system. The method further includes simultaneously injecting and reproducing in an underground gas storage via a plurality of dual producer and injector wells. The method further includes enhancing the underground gas storage reservoir management to maximize gas and condensate recovery. The method further includes improving a switching cycle between dual operation modes in the underground gas storage for faster reaction times through a completely segregated injection and reproduction lines.

20 Claims, 6 Drawing Sheets

(56) References Cited

U.S. PATENT DOCUMENTS

2015/0321850 A1 11/2015 Strybos
2020/0133212 A1 4/2020 Rekunyk

FOREIGN PATENT DOCUMENTS

| EP | 0471445 A1 | 2/1992 |
| EP | 3502012 A1 | 6/2019 |
| GB | 2279732 A | 1/1995 |
| RU | 2310744 C1 | 11/2007 |
| RU | 2508445 C1 | 2/2014 |
| RU | 2686259 C1 | 4/2019 |

OTHER PUBLICATIONS

L. E. Sobers "Design of Simultaneous Enhanced Oil Recovery and Carbon Dioxide Storage With Potential Application to Offshore Trinidad" SPE Journal; Apr. 2013; 345-354 (10 pages).

W. F. Burke "Simultaneous Underground Gas Storage and Secondary Oil Recovery" Journal of Petroleum Technology; Jul. 1960; 22-26 (5 pages).

C. I. Anyadiegwu, "Development of Depleted Oil Reservoirs for Simultaneous Gas Injection for Underground Natural Sas Storage and Enhanced Oil Recovery in Nigeria." Paper presented at the SPE Nigeria Annual International Conference and Exhibition, Lagos, Nigeria, Aug. 2016 (18 pages).

* cited by examiner

Table: Total Condensate Production Comparison in a Simplified Supply-Demand Case

| Simplified Gas Program Supply-Demand Case | | Standard Process | Peripheral Gas Injection Concept |
|---|---|---|---|
| Sales Gas Demand | | 1,000 | 1,000 |
| Sales Gas Supply | Field A (Dry, CGR* = 2) | 1,000 | 1,000 |
| | Field B (Rich, CGR = 20) | 500 | 500 |
| Gas Storage | Injection (Excess Gas) | -500 | -1,000 |
| | Withdrawal (CGR = 10) | 0 | 500 |
| Sales Gas Balance (Supply-Demand) | | 0 | 0 |
| Total Condensate | | 12,000 | 17,000 |

*CGR is Condensate Gas Ratio

SIMULTANEOUS INJECTION-REPRODUCTION IN UNDERGROUND GAS STORAGE

FIELD OF THE INVENTION

The invention generally relates to underground gas storage. More specifically, the invention relates to the underground gas storage providing simultaneous dual operation mode flexibility to inject and re-produce at the same time in different areas of a field.

BACKGROUND

Underground gas storage is a method to maintain a constant supply of a gas from a natural gas pipeline combined with a variable demand for the gas for an economic advantage. Because the gas consuming market is seasonal and critically fluctuates with the severity of weather, sufficient underground gas storage will allow the purchase and storage of the gas in low-demand periods and the delivery of such gas to markets in the required volumes in periods of high demand.

The environment for the underground gas storage is usually provided by depleted gas or oil fields, porous and permeable aquifers as well as underground cavities, mined or developed in salt domes by freshwater leaching. Underground gas storage projects around the world lack the flexibility to inject and re-produce simultaneously. Although few commercially available alternatives claim to provide switching between the two modes of operation in very short time (e.g., in a matter of minutes) to ensure short response time. However, none of these options currently has the simultaneous dual operation mode flexibility to inject and re-produce at the same time in different areas of the field.

The production system, which is in the oil fields, and the transport system, which is by pipeline or LNG tanker, require considerable investment. Adjusting these systems so that they can always instantly meet the peak demand of the coldest days of the year would be an economic absurdity because a large part of the investments would be useless the rest of the year.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method for an underground gas storage reservoir management. The method includes obtaining feed from a domestic master gas system. The method further includes simultaneously injecting and reproducing in an underground gas storage via a plurality of dual producer and injector wells. The method further includes enhancing the underground gas storage reservoir management to maximize gas and condensate recovery. The method further includes improving a switching cycle between dual operation modes in the underground gas storage for faster reaction times through a completely segregated injection and reproduction lines.

In another aspect, embodiments disclosed herein generally relate to a system that includes a domestic master gas system, a plurality of dual producer and injector wells, an underground gas storage, a plurality of scrapers, a plurality of injection compressors, and a plurality of reproduction compressors. The system further includes a control system coupled to a plurality of sensors. The system further includes a subsurface reservoir simulator that includes a computer processor. The subsurface reservoir simulator is coupled to the plurality of injection compressors and the plurality of reproduction compressors. The subsurface reservoir simulator obtains feed from a domestic master gas system. The subsurface reservoir simulator simultaneously injects and reproduces in an underground gas storage via a plurality of dual producer and injector wells. The subsurface reservoir simulator enhances the underground gas storage reservoir management to maximize gas and condensate recovery. The subsurface reservoir simulator improves a switching cycle between dual operation modes in the underground gas storage for faster reaction times through a completely segregated injection and reproduction lines.

In another aspect, embodiments disclosed herein generally relate to a non-transitory computer readable medium storing instruction. The instructions are executable by a computer processor and include functionality for obtaining feed from a domestic master gas system. The instruction further includes simultaneously injecting and reproducing in an underground gas storage via a plurality of dual producer and injector wells. The instruction further includes ensuring continuous production from rich gas fields by injecting a processed excess lean gas into the underground gas storage and simultaneously reproducing a richer gas from the underground gas storage at minimum operating and development cost. The instruction further includes enhancing an underground gas storage reservoir management to maximize gas and condensate recovery. The instruction further includes improving a switching cycle between dual operation modes in the underground gas storage for faster reaction times through a completely segregated injection and reproduction lines.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency.

DETAILED DESCRIPTION

Specific embodiments of the disclosure will now be described in detail with reference to the accompanying figures.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments are directed to underground gas storage system for providing simultaneous dual operation mode flexibility to inject and re-produce at the same time in different areas of a field. For natural gas, most of the storage is carried out underground. In particular, the underground gas storage system may incorporate enhancing gas storage reservoir management to maximize gas and condensate recovery and control formation water production via proper reservoir pressure distribution across the field. In addition, the underground gas storage system may incorporate improvement in a switching cycle between modes of operation resulting in faster reaction times in case of emergency through a completely segregated injection and re-production lines. Therefore, embodiments disclosed herein may implement simultaneous operation of both modes to guarantee higher condensate and byproduct recovery and more efficient reservoir management as well as the faster reaction time. Other embodiments may maximize all enhanced associated gas byproducts and associated monetary value. Other embodiments may provide ultimate flexibility to the existing underground gas storage operation with minor modification by utilizing dual injection/re-production.

Embodiments of the invention may be used in the storage of other energy products and resources to make a decisive contribution to the energy transition (for example, carbon dioxide sequestration, hydrogen storage, methanation, and compressed air storage). In other words, the technical know-how accumulated with the improved underground storage of hydrocarbons is an asset for future developments.

Figure 1A:
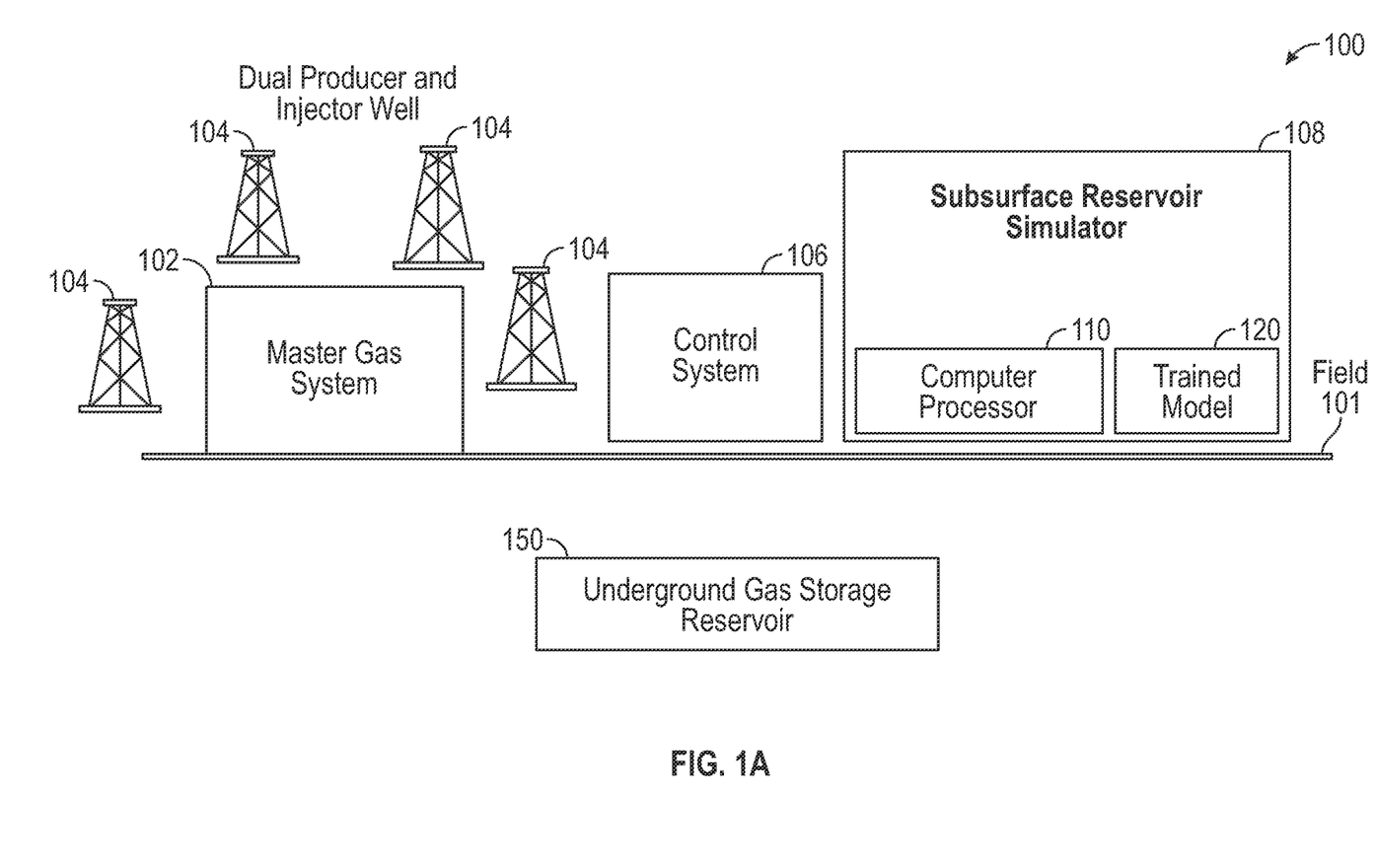
FIGS. 1A and 1B show systems in accordance with one or more embodiments.

FIG. 1A shows a schematic diagram in accordance with one or more embodiments. FIG. 1A illustrates a system for underground gas storage reservoir management environment (100) that may include a master gas system (102) with a plurality of dual producer and injector well (104) spreading across different areas of a field (101) and extending into an underground gas reservoir (105). The dual producer and injector well (104) may include a bored hole that extends from a surface into the underground gas reservoir (105).

Keeping with FIG. 1A, the underground gas storage reservoir management environment (100) may include a control system (106) and a subsurface reservoir simulator (108). The subsurface reservoir simulator (108) may couple to the logging system and the drilling system of the dual producer and injector wells (104). The control system (106) may include a plurality of sensors and hardware or software for managing drilling operations or maintenance operations. For example, the control system (106) may include one or more programmable logic controllers (PLCs) that include hardware or software with functionality to control one or more processes performed by the drilling system of the dual producer and injector wells (104). Specifically, a programmable logic controller may control valve states, fluid levels, pipe pressures, warning alarms, or pressure releases throughout a drilling rig. In particular, a programmable logic controller may be a ruggedized computer system with functionality to withstand vibrations, extreme temperatures (for example, ~575° C.), wet conditions, or dusty conditions, for example, around a drilling rig.

In one or more embodiments, the stored gas must remain contained. The initial recognition makes it possible to verify the favorable geometric and hydrogeological conditions and the progressive digging of the wells makes it possible to confirm them, by sampling samples and logistic measurements (one goes down into a well, at the end of a cable, a sensor which measures the gas and water content, water pressure, porosity, temperature etc.) using the programmable logic controller. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the subsurface reservoir simulator (108), the subsurface reservoir simulator (108) may include hardware or software with functionality for generating one or more trained models (120) regarding the underground gas storage reservoir (150). For example, the subsurface reservoir simulator (108) may obtain data from the dual producer and injector wells (104) and store well logs and data regarding core samples, and further analyze the well log data, the core sample data, or other types of data to generate or update the one or more trained models (120) having a complex geological environment. For example, different types of models may be trained, such as artificial intelligence, convolutional neural networks, deep neural networks, support vector machines, decision trees, inductive learning models, deductive learning models, and supervised learning models, and are capable of approximating solutions of complex non-linear problems.

In some embodiments, the subsurface reservoir simulator (108) may include functionality for applying deep learning methodologies to precisely determine various subsurface layers. To do so, a large amount of interpreted data may be used to train a model. To obtain this amount of data, the subsurface reservoir simulator (108) may augment acquired data for various geological scenarios and drilling situations. For example, drilling logs may provide similar log signatures for a particular subsurface layer except where a well encounters abnormal cases. Such abnormal cases may include, for example, changes in subsurface geological compositions, well placement of artificial materials, or various subsurface mechanical factors that may affect logging tools. As such, the amount of well data with abnormal cases available to subsurface reservoir simulator (108) may be insufficient for training a model. Therefore, in some embodiments, the subsurface reservoir simulator (108) may use data augmentation to generate a dataset that combines original acquired data with augmented data based on geological and drilling factors. This supplemented dataset may provide sufficient training data to obtain the trained model (120) accordingly. In one or more embodiments, the trained model (120) is a hydrogeological model of the underground gas storage reservoir (150) which stores the history of the injected and withdrawn flows and the pressure measurements carried out continuously on the dual producer and injector wells (104) make it possible to improve it gradually by comparing forecasts and measurements (history matching).

In some embodiments, the subsurface reservoir simulator (108) is implemented in a software platform for the control system (106). The software platform may obtain data acquired by the system of the dual producer and injector wells (104) as inputs, which may include multiple data types from multiple sources. The software platform may aggregate the data from these systems in real time for rapid analysis. Real-time of or relating to computer systems in the software platform is defined as the actual time for updating information with instantaneous processing at the same rate as required by a user or necessitated by a process being controlled. In some embodiments, the control system (106) or the subsurface reservoir simulator (108) may include a computer system with a computer processor (110) that is similar to the computer system (600) described with regard to FIGS. 6A and 6B and the accompanying description.

Figure 1B:
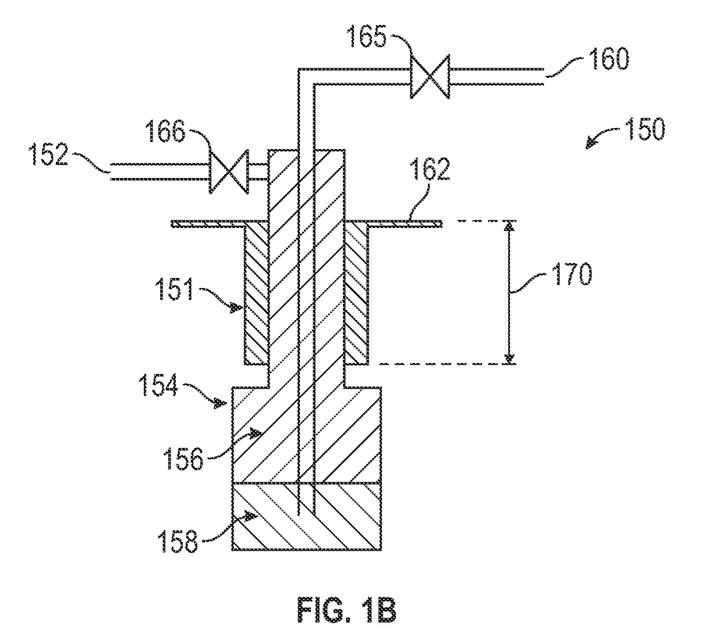

Turning to FIG. 1B, FIG. 1B illustrates the underground gas storage reservoir (150) that may include compressible multiple hydrocarbon streams (156) from different gas plants with varying stream composition stored in an underground gas storage (154) in accordance with one or more embodiments. The underground gas storage (154) may be a salt cavern, a depleted reservoir in an oil or gas field, an aquifer, or any system known to one skilled in the art. The underground gas storage (154) may have an injection line (152), with flow and/or pressure control injection valve (166), for injecting the compressible multiple hydrocarbon streams (156). The underground gas storage (154) may contain a hydrocarbon stream mix byproduct (158). The hydrocarbon stream mix byproducts (158) may be Natural gas liquids (NGLs), which are a group of hydrocarbons that includes ethane, propane, butane, isobutane, and natural gasoline known to one skilled in the art. The underground gas storage (154) may have a reproduction line (160), with flow and/or pressure control reproduction valve (165), for reproducing or removing the hydrocarbon stream mix byproducts (158).

In some embodiments, as the underground gas storage (154) may be at a considerable depth below grade (162), the nominally vertical portions of first conduit (152) and/or second conduit (160) may be anchored into the surrounding rock formations by means of a cemented casing (151). The depth of the casing from grade (151) to the limit of the cemented casing (151) is the depth of the casing.

Figure 2:
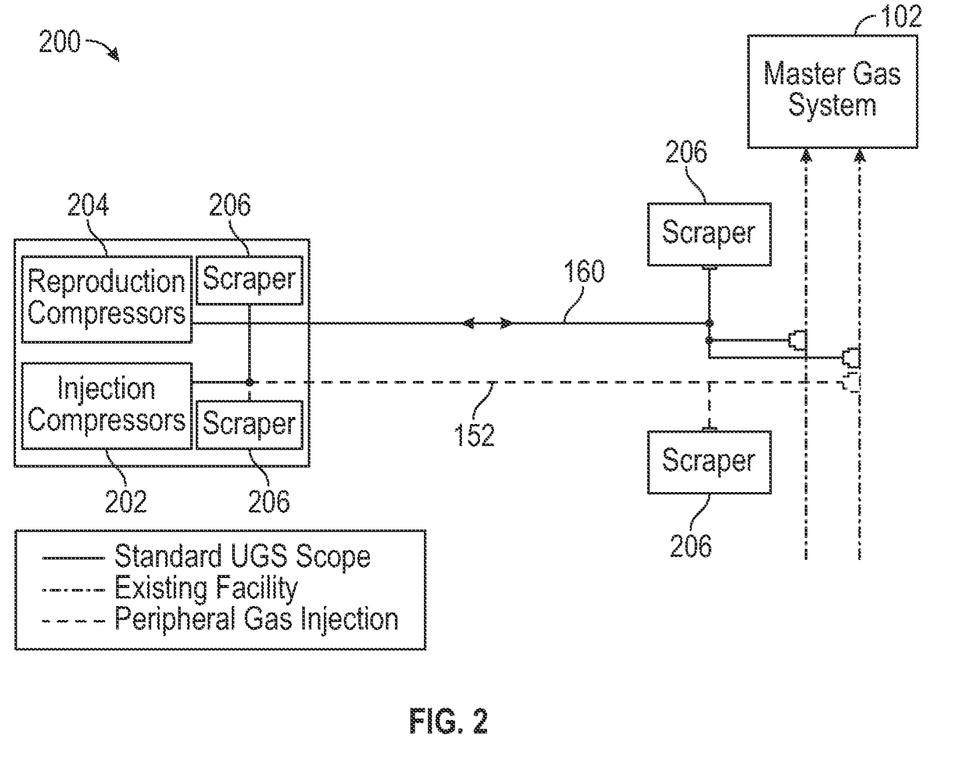
FIG. 2 shows a system in accordance with one or more embodiments.

Turning to FIG. 2, FIG. 2 illustrates a system (200) which may include the master gas system (102) and the underground gas storage reservoir (150) in accordance with one or more embodiments. The system (200) may further include a plurality of injection compressors (202), a plurality of reproduction compressors (204), and a plurality of scrapers (206) connecting the injection lines (152) and reproduction (160) lines of the underground gas storage reservoir (150) to the master gas system (102). For example, the compressible multiple hydrocarbon streams (156) are compressed via the injection compressors (202). Similarly, the hydrocarbon stream mix byproducts (158) are compressed via the reproduction compressors (204). After compression, the compressible multiple hydrocarbon streams (156) are injected and the hydrocarbon stream mix byproducts (158) are reproduced in the underground gas storage (154), respectively, via a plurality of dual producer and injector wells (104), as shown in FIG. 1A.

One or more embodiments of the invention may provide at least one of the following advantages:

1) Enhanced gas storage reservoir management to maximize gas and condensate recovery and control formation water production via proper reservoir pressure distribution across the field.

2) Improve the switching cycle between modes of operation resulting in faster reaction times in case of emergency through a completely segregated injection and reproduction lines.

3) Dual operation mode to maximize condensate recovery from sufficiently-depleted rich-gas condensate reservoirs converted to gas storage operations through strategies such as pattern injection (e.g., injecting in the flanks and producing from the crest) and producing simultaneously. This will ensure maximizing the net present value of the project by monetizing all enhanced associated gas byproducts recovery value.

4) Moreover, if the domestic master gas system's feed consists of multiple hydrocarbon streams from different gas plants with varying stream composition, this flexibility allows maximizing the stream-mix byproducts and its associated monetary value. This can be achieved via ensuring continuous production from the rich gas condensate fields, regardless of the sales gas demand, by injecting the excess processed lean gas into the gas storage while at the same time reproducing richer gas from the gas storage itself simultaneously at the minimum operating/development cost.

5) Dual injection/reproduction provides the ultimate flexibility of storage operation with minor modification in the present storage system.

Figure 3:
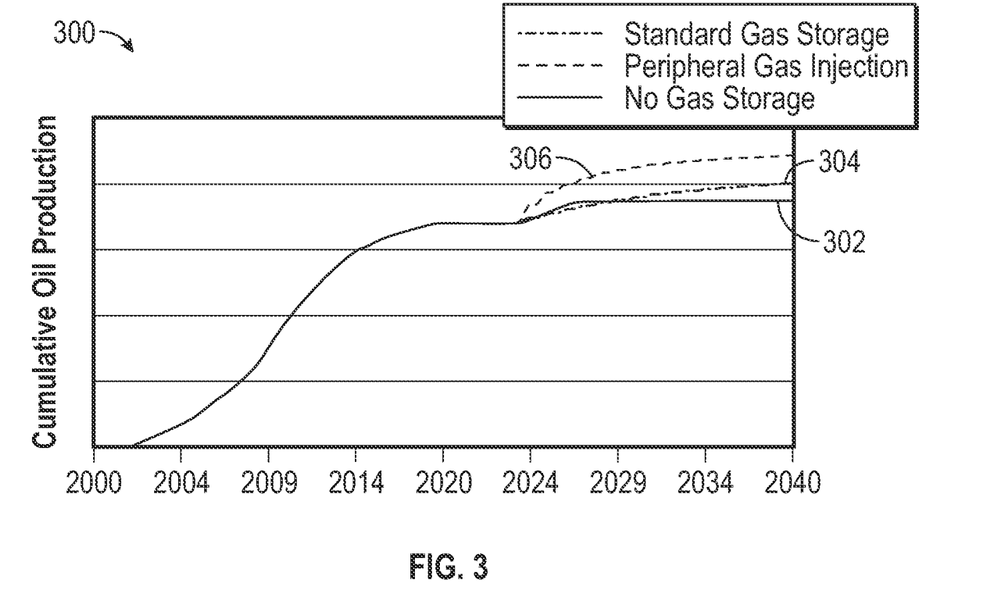
FIG. 3 shows an example in accordance with one or more embodiments.

In some embodiments, relevant data obtained from the embodiments of the invention can be divided into the following categories:

Simulation Results: In this section, the usefulness of the proposed concept has been confirmed by utilizing subsurface reservoir modelling. FIG. 3 shows cumulative oil production for historical pre-gas storage period and post-gas storage period for about 20 years for the basic simulation results comparison of three scenarios: 1—No Gas Storage (302); 2—Normal/Standard Gas Storage (304); and 3—Peripheral Gas Injection (306).

In one or more embodiments, not only the liquid production is enhanced by the peripheral gas injection (306) but also the associated by-products that can be processed and sold to benefit the profitability of the application of the peripheral gas injection (306).

Figure 4A:
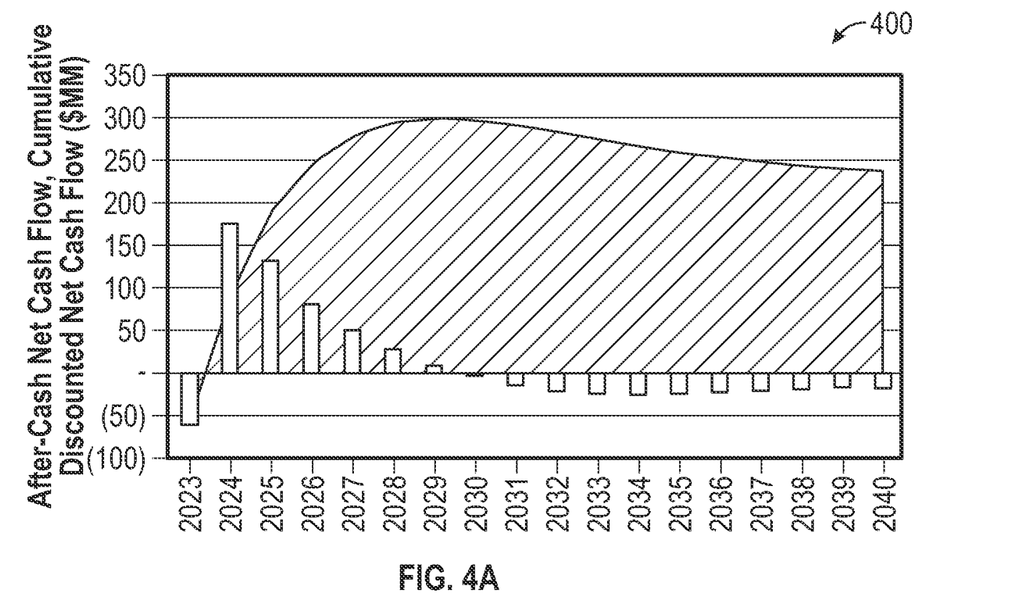
FIGS. 4A and 4B show examples in accordance with one or more embodiments.
Figure 4B:
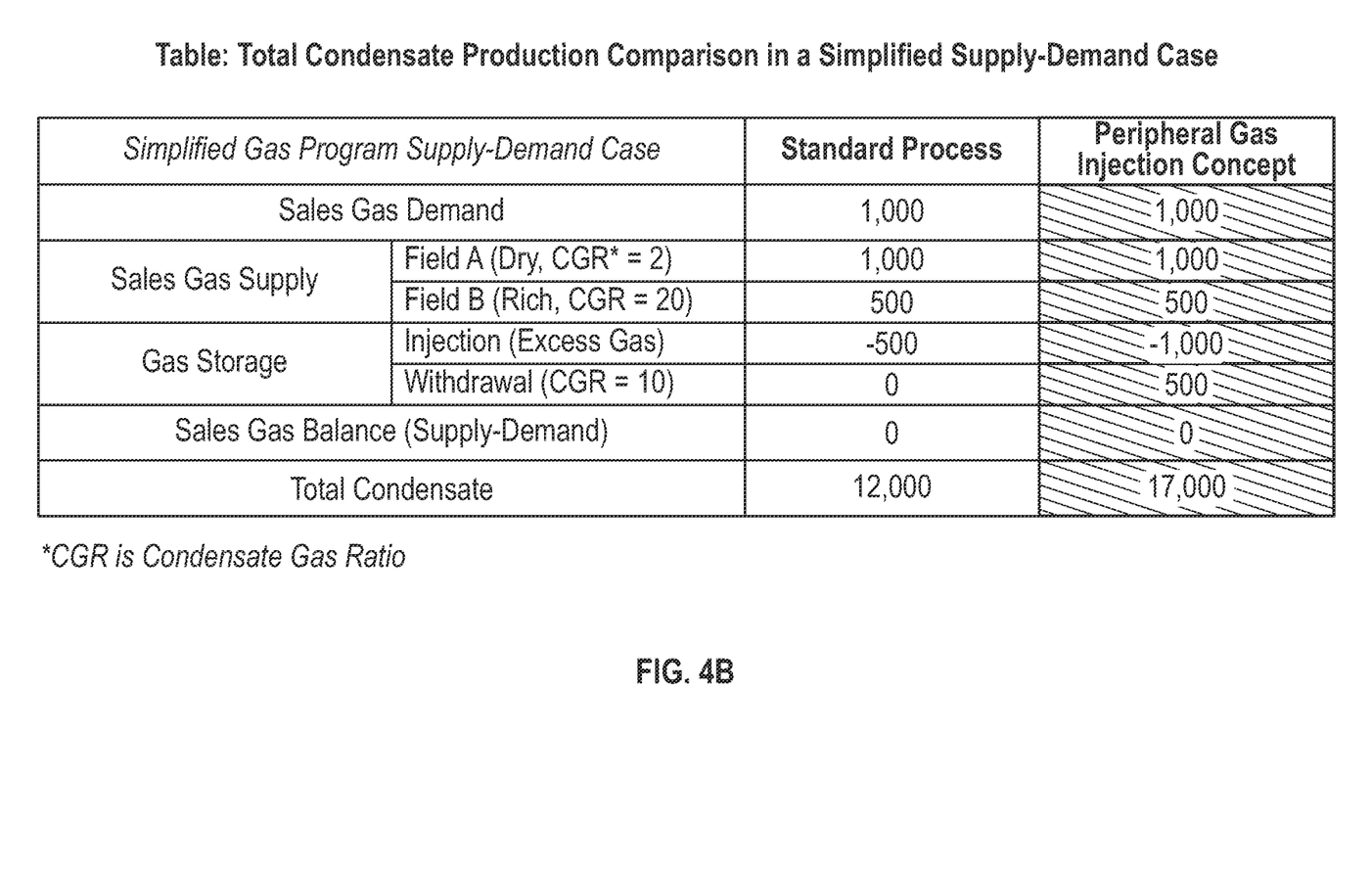

Economic model results: In this section, the economic analysis model for implementing the above concept of the peripheral gas injection (306) to replace the normal gas storage operations has been shown. The results utilize a differential economics model that assesses the profitability increase because of applying the concept of the peripheral gas injection (306), which is mainly attributed to improved condensate and associated by-products recovery, while taking into account for the additional cost required for implementing such application. Results (400) in FIG. 4 show that the concept of the peripheral gas injection (306) is profitable with an attractive net-present-value NPV.

Invention Advantages to the Gas Program: This section presents how the concept of the peripheral gas injection (306), which is profitable to the field itself as mentioned above, can also add value to the whole gas program via optimization. In order to show how the new simultaneous injection-reproduction fits into the Gas Program and to prove its monetary advantage, a very simplified Gas Program sales gas supply and demand case with only two operating fields and a gas storage have been presented. The process for the standard gas storage (304) with the concept of the peripheral gas injection (306) is compared in the table shown in FIG. 4B.

In one or more embodiments, the simplified case above shows about 50% increase in condensate production due to utilizing the new concept with an optimization strategy. Now, the reason why Field A which has dry gas (lower monetary profit) has a minimum rate constraint is the assumption that Field-A has higher priority in the production priority list to maximize its sales gas production for any reason such as being a shared field or cost. On the other hand, Field B which has rich gas has a maximum rate constraint due to the assumption that this is the maximum capacity of the facility, for example. With the flexibility of injecting excess gas while at the same time producing from the underground gas storage, the total condensate of the gas production can be optimized and improved adding significant monetary benefits.

Figure 5:
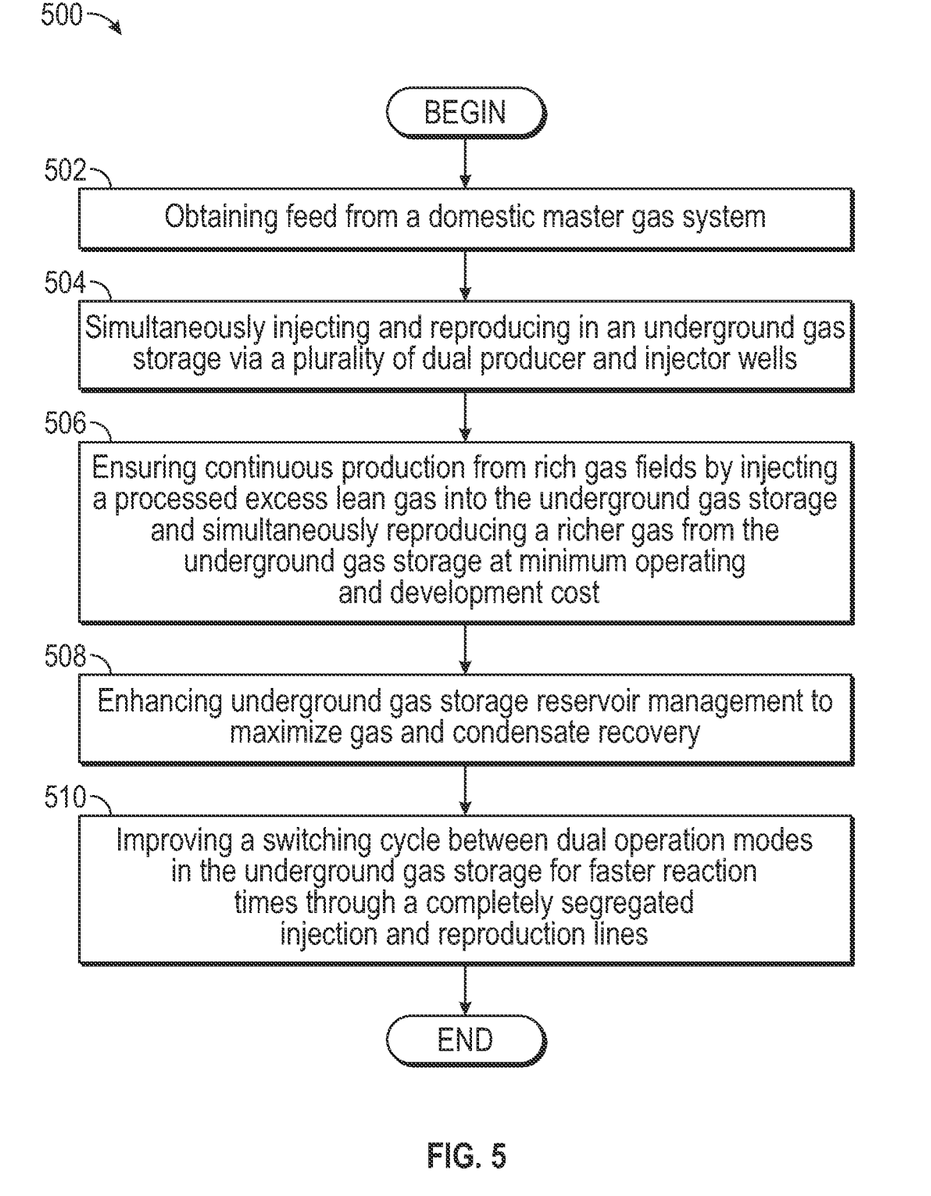
FIG. 5 shows a flowchart in accordance with one or more embodiments.

FIG. 5 shows a flowchart (500) in accordance with one or more embodiments. Specifically, FIG. 5 describes a general method for an underground gas storage reservoir management. One or more steps in FIG. 5 may be performed by one or more components (for example, underground gas storage reservoir (150)) as described in FIGS. 1-2. While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In step 502, a feed is obtained from a domestic master gas system in accordance with one or more embodiments. For example, multiple hydrocarbon streams from different gas plants with varying stream composition (for example, compressible multiple hydrocarbon streams (156)) may be used as feed for the domestic master gas system (for example, domestic master gas system (102)) described previously in FIG. 1B and the accompanying description.

In step 504, simultaneously injection and reproduction are done in an underground gas storage via a plurality of dual producer and injector wells in accordance with one or more embodiments. For example, the compressible multiple hydrocarbon streams (156) and the hydrocarbon stream mix byproduct (158) are simultaneously injected and reproduced in the underground gas storage (154), respectively, via a plurality of dual producer and injector wells (104) described previously in FIGS. 1-2 and the accompanying description.

In step 506, a continuous production is ensured from rich gas fields by injecting a processed excess lean gas via multiple hydrocarbon streams into the underground gas storage (154) and simultaneously reproducing a richer gas from the underground gas storage (154) at minimum operating and development cost described previously in FIGS. 1-2 and the accompanying description.

In step 508, the underground gas storage reservoir management (100) is enhanced to maximize gas and condensate recovery described previously in FIGS. 1-2 and the accompanying description.

In step 510, a switching cycle between dual operation modes is improved in the underground gas storage (154) for faster reaction times through a completely segregated injection (152) and reproduction lines (160).

In other words, the embodiments of the invention for the concept of the peripheral gas injection not only allows to adapt the pattern injection strategy to maximize condensate recovery, but may also act as a buffer for allowing maximum production from other rich-gas condensate fields while at the same time producing rich gas from the underground gas storage itself. This is particularly important in cases such as sufficiently depleted condensate-rich gas fields, as well as for controlling water aquifer encroachment in fields with water-drive. Also, completely segregated injection and reproduction lines improves the switching cycle between modes of operation resulting in faster reaction times in case of emergency.

Figure 6A:
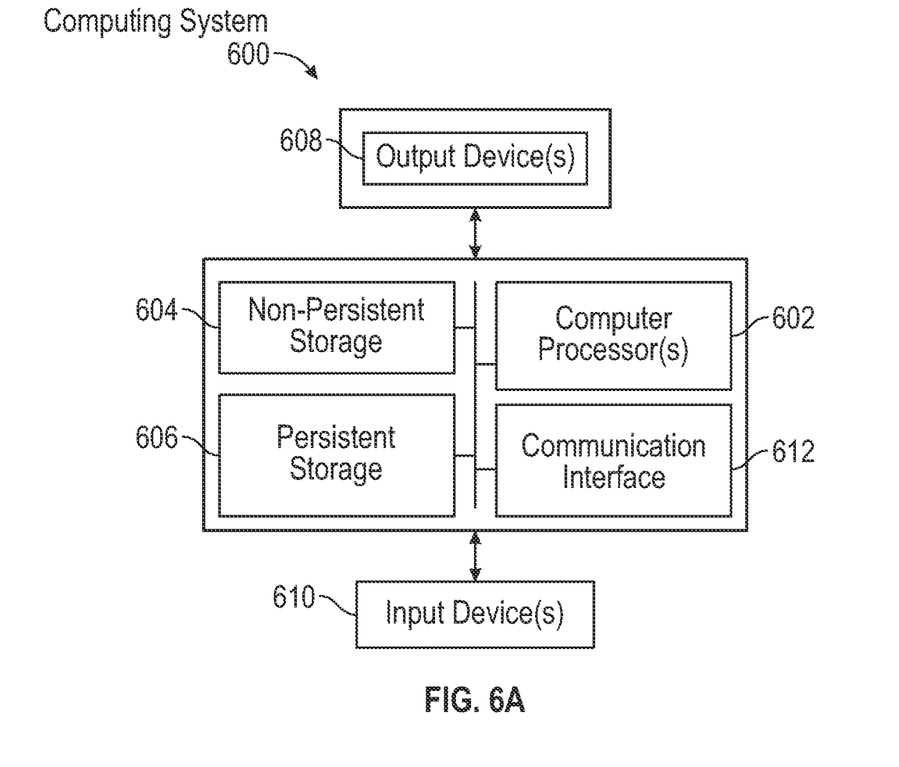
FIGS. 6A and 6B show a computing system in accordance with one or more embodiments.

Embodiments may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (for example, volatile memory, such as random access memory (RAM), cache memory), persistent storage (606) (for example, a hard disk, an optical drive such as a compact disk (CD) drive or digital versatile disk (DVD) drive, a flash memory), a communication interface (612) (for example, Bluetooth interface, infrared interface, network interface, optical interface), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, or electronic pen.

The communication interface (612) may include an integrated circuit for connecting the computing system (600) to a network (not shown) (for example, a local area network (LAN), a wide area network (WAN), such as the Internet, mobile network, or any other type of network) or to another device, such as another computing device.

Further, the computing system (600) may include one or more output devices (608), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 6B:
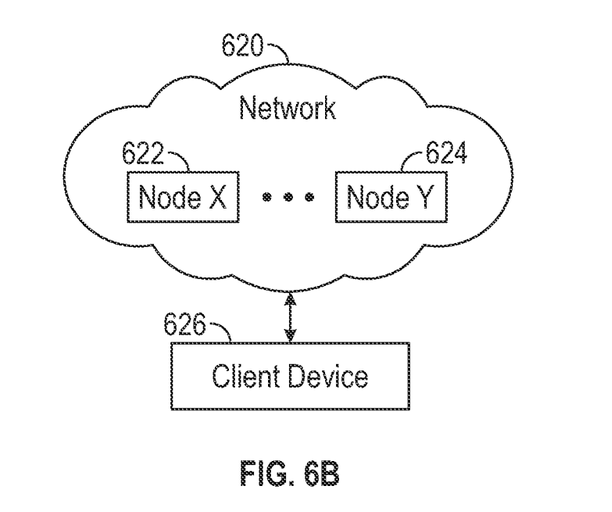

The computing system (600) in FIG. 6A may be connected to or be a part of a network. For example, as shown in FIG. 6B, the network (620) may include multiple nodes (for example, node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (for example, node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided in subsequent paragraphs.

Based on the client-server networking model, sockets may serve as interfaces or communication channel endpoints enabling bidirectional data transfer between processes on the same device. Foremost, following the client-server networking model, a server process (for example, a process that provides data) may create a first socket object. Next, the server process binds the first socket object, thereby associating the first socket object with a unique name or address. After creating and binding the first socket object, the server process then waits and listens for incoming connection requests from one or more client processes (for example, processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (for example, bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the selection by the user.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the selection by the user. Further to the above example, the data received from the server after selecting the URL link may provide a web page in Hyper Text Markup Language (HTML) that may be rendered by the web client and displayed on the user device.

Once data is obtained, such as by using techniques described previously or from storage, the computing system, in performing one or more embodiments of the disclosure, may extract one or more data items from the obtained data. For example, the extraction may be performed as follows by the computing system (600) in FIG. 6A. First, the organizing pattern (for example, grammar, schema, layout) of the data is determined, which may be based on one or more of the following: position (for example, bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (for example, A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (that is, circuitry that performs arithmetic or bitwise logical operations on the two data values). The ALU outputs the numerical result of the operation or one or more status flags related to the numerical result. For example, the status flags may indicate whether the numerical result is a positive number, a negative number or zero. By selecting the proper opcode and then reading the numerical results or status flags, the comparison may be executed. For example, in order to determine if $A>B$, B may be subtracted from A (that is, $A-B$), and the status flags may be read to determine if the result is positive (that is, if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6A may implement or be connected to a data repository. For example, one type of data repository is a database. A database is a collection of information configured for ease of data retrieval, modification, re-organization, and deletion. Database management system (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (for example, join, full join, count, average), sort (for example, ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The previous description of functions presents only a few examples of functions performed by the computing system of FIG. 6A and the nodes or client device in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for an underground gas storage reservoir management comprising:
    obtaining feed from a domestic master gas system;
    simultaneously injecting and reproducing in an underground gas storage via a plurality of dual producer and injector wells, wherein each of the dual producer and injector wells comprises and injection line and a reproduction line that connect to the master gas system and can operate both in an injector mode or in a reproducer mode, wherein the injection line and reproduction line are segregated; and
    determining a pattern injection strategy, wherein the pattern injection strategy indicates which of the plurality of dual producer and injector wells is in injector mode and which of the plurality of dual producer and injector wells is in reproducer mode;
    wherein the simultaneous injecting and reproducing in underground gas storage enhances the underground gas storage reservoir management by maximizing gas and condensate recovery;
    wherein a switching cycle between dual operation modes in the plurality of dual producer and injector wells is improved for faster reaction times due to the segregated injection and reproduction lines comprised by each of the plurality of dual producer and injector wells.

2. The method of claim 1, further comprising controlling formation water production of the underground gas storage via a proper reservoir pressure distribution across a field, wherein the reservoir pressure distribution is controlled by the plurality of dual producer and injector wells.

3. The method of claim 2, wherein the dual operation modes maximize the condensate recovery from sufficiently-depleted rich gas condensate reservoirs converted to gas storage operations by implementing the pattern injection strategy and producing simultaneously in different areas of the field.

4. The method of claim 3, wherein the pattern injection strategy comprises injecting in flanks and producing from a crest.

5. The method of claim 1, further comprising ensuring continuous production from rich gas fields by injecting a processed excess lean gas into the underground gas storage and simultaneously reproducing a richer gas from the underground gas storage at minimum operating and development cost.

6. The method of claim 1, wherein a feed from the domestic master gas system comprises multiple hydrocarbon streams from different gas plants with varying stream composition.

7. The method of claim 6, wherein both liquid production and associated stream mix byproducts of the domestic master gas system are enhanced.

8. A system for an underground gas storage reservoir management, comprising:
    a domestic master gas system;
    a plurality of dual producer and injector wells, wherein each of the dual producer and injector wells comprises and injection line and a reproduction line that connect to the master gas system and can operate both in an injector mode or in a reproducer mode, wherein the injection line and reproduction line are segregated;
    an underground gas storage accessible by each of the plurality of dual producer and injector wells;
    a plurality of scrapers;
    a plurality of injection compressors;
    a plurality of reproduction compressors;

a control system coupled to a plurality of sensors; and
a subsurface reservoir simulator comprising a computer processor, wherein the subsurface reservoir simulator is coupled to the plurality of injection compressors and the plurality of reproduction compressors and is configured to:
  obtain feed from the domestic master gas system;
  simultaneously inject and reproduce in the underground gas storage via the plurality of dual producer and injector wells; and
  determine a pattern injection strategy, wherein the pattern injection strategy indicates which of the plurality of dual producer and injector wells is in injector mode and which of the plurality of dual producer and injector wells is in reproducer mode;
  wherein the simultaneous injecting and reproducing in underground gas storage enhances the underground gas storage reservoir management by maximizing gas and condensate recovery;
  wherein a switching cycle between dual operation modes in the plurality of dual producer and injector wells is improved for faster reaction times due to the segregated injection and reproduction lines comprised by each of the plurality of dual producer and injector wells.

9. The system of claim 8, wherein the subsurface reservoir simulator is configured to control formation water production of the underground gas storage via a proper reservoir pressure distribution across a field, wherein the reservoir pressure distribution is controlled by the plurality of dual producer and injector wells.

10. The system of claim 9, wherein the dual operation modes maximize the condensate recovery from sufficiently-depleted rich gas condensate reservoirs converted to gas storage operations by implementing the pattern injection strategy and producing simultaneously in different areas of the field.

11. The system of claim 10, wherein the pattern injection strategy comprises injecting in flanks and producing from a crest.

12. The system of claim 8, wherein the subsurface reservoir simulator is further configured to ensure continuous production from rich gas fields by injecting a processed excess lean gas into the underground gas storage and simultaneously reproducing a richer gas from the underground gas storage at minimum operating and development cost.

13. The system of claim 8, wherein a feed from the domestic master gas system comprises multiple hydrocarbon streams from different gas plants with varying stream composition.

14. The system of claim 13, wherein both liquid production and associated stream mix byproducts of the domestic master gas system are enhanced.

15. A non-transitory computer readable medium storing instructions executable by a computer processor, the instructions comprising functionality for:
  obtaining feed from a domestic master gas system;
  simultaneously injecting and reproducing in an underground gas storage via a plurality of dual producer and injector wells, wherein each of the dual producer and injector wells comprises and injection line and a reproduction line that connect to the master gas system and can operate both in an injector mode or in a reproducer mode, wherein the injection line and reproduction line are segregated;
  determining a pattern injection strategy, wherein the pattern injection strategy indicates which of the plurality of dual producer and injector wells is in injector mode and which of the plurality of dual producer and injector wells is in reproducer mode; and
  injecting a processed excess lean gas into the underground gas storage and simultaneously reproducing a richer gas from the underground gas storage to ensure continuous production at minimum operating and development cost;
  wherein the simultaneous injecting and reproducing in underground gas storage enhances an underground gas storage reservoir management to maximize gas and condensate recovery;
  wherein a switching cycle between dual operation modes in the plurality of dual producer and injector wells is improved for faster reaction times due to the segregated injection and reproduction lines comprised by each of the plurality of dual producer and injector wells.

16. The non-transitory computer readable medium of claim 15, wherein the instructions further comprise functionality for controlling formation water production of the underground gas storage via a proper reservoir pressure distribution across a field, wherein the reservoir pressure distribution is controlled by the plurality of dual producer and injector wells.

17. The non-transitory computer readable medium of claim 16, wherein the dual operation modes maximize the condensate recovery from sufficiently-depleted rich gas condensate reservoirs converted to gas storage operations by implementing the pattern injection strategy and producing simultaneously in different areas of the field.

18. The non-transitory computer readable medium of claim 17, wherein the pattern injection strategy comprises injecting in flanks and producing from a crest.

19. The non-transitory computer readable medium of claim 15, wherein a feed from the domestic master gas system comprises multiple hydrocarbon streams from different gas plants with varying stream composition.

20. The non-transitory computer readable medium of claim 19, wherein both liquid production and associated stream mix byproducts of the domestic master gas system are enhanced.

* * * * *